(12) United States Patent
Pressler et al.

(10) Patent No.: US 9,127,702 B2
(45) Date of Patent: Sep. 8, 2015

(54) CLAMPING CONNECTION FOR MOUNTING PLATE-LIKE COMPONENTS, IN PARTICULAR SOLAR MODULES

(75) Inventors: Ulla Pressler, Hemsbach (DE); Jason Kohn, Hirschberg (DE); Armin Barth, Gorxheimertal (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 14/126,938

(22) PCT Filed: Aug. 23, 2012

(86) PCT No.: PCT/EP2012/003569
§ 371 (c)(1),
(2), (4) Date: Dec. 17, 2013

(87) PCT Pub. No.: WO2013/029766
PCT Pub. Date: Mar. 7, 2013

(65) Prior Publication Data
US 2014/0169870 A1    Jun. 19, 2014

(30) Foreign Application Priority Data
Aug. 30, 2011 (DE) .......................... 10 2011 111 449

(51) Int. Cl.
F16B 5/06 (2006.01)
E04F 13/08 (2006.01)
F24J 2/52 (2006.01)
H01L 31/042 (2014.01)
H02S 20/23 (2014.01)
F16B 21/20 (2006.01)

(52) U.S. Cl.
CPC ........... *F16B 5/0685* (2013.01); *E04F 13/0814* (2013.01); *F24J 2/5256* (2013.01);
(Continued)

(58) Field of Classification Search
CPC ......... Y02B 10/12; Y02E 10/47; H02S 20/00; F24J 2/5211; F24J 2/5254; F16B 5/0685; F16B 12/32; F16B 9/023; F16B 7/04

USPC ................ 248/316.1, 316.6, 220.21, 220.22, 248/229.1
See application file for complete search history.

(56) References Cited

U.S. PATENT DOCUMENTS 3,737,609 A * 6/1973 Overkott ....................... 219/642
8,839,573 B2 * 9/2014 Cusson et al. ............... 52/173.3
(Continued)

FOREIGN PATENT DOCUMENTS

| CN | 201804876 U | 4/2011 |
| DE | 202009014048 U1 | 2/2010 |

(Continued)

*Primary Examiner* — Steven Marsh
(74) *Attorney, Agent, or Firm* — Fraser Clemens Martin & Miller LLC; James D. Miller (57) ABSTRACT

Clamping connection (1) for mounting plate-like components (13) on rail-like supports (8), in particular solar modules comprising a bearing (2), a central supporting bar (4) which is oriented in the longitudinal direction of the clamping connection (1) and has lateral wing strips (5, 6) with bearing surfaces (10, 11) for the components (13), and an abutment (7), which is present on the lower face of said supporting bar, for mounting the bearing (2) on the support (8), and a clamping cap (3) having a longitudinal groove (9) which surrounds the upper part of the supporting bar (4), and having clamping surfaces (13, 14) which cover the bearing surfaces (10, 11) of the bearing (2), and having a holding connection (25, 28, 29) for fixing the clamping cap (3) on the bearing (2), wherein the support (8) has guide grooves with edges (34) which project inwardly into the groove, and the abutment (7) is formed in a T shape, is inserted into the guide groove by way of its transverse bar (36) and engages behind the projecting edges (34) after rotation through 90°, characterized in that the bearing (2) has a passage (24), a spring disc (31) being accommodated in the center of said passage and said spring disc surrounding a retaining pin (30), which is pushed into said spring disc and is connected to the clamping cap, in a force-fitting manner and thereby fixing the clamping cap (3) to the bearing (2).

20 Claims, 8 Drawing Sheets

(52) U.S. Cl.
CPC .............. *F24J 2/5262* (2013.01); *H02S 20/00* (2013.01); *H02S 20/23* (2014.12); *F16B 21/20* (2013.01); *Y02B 10/12* (2013.01); *Y02E 10/47* (2013.01); *Y02E 10/50* (2013.01); *Y10T 403/7064* (2015.01)

(56) References Cited

U.S. PATENT DOCUMENTS

| | | | | |
|---|---|---|---|---|
| 2007/0241249 | A1* | 10/2007 | Ford | 248/220.21 |
| 2009/0200443 | A1 | 8/2009 | Burtscher et al. | |
| 2010/0219304 | A1* | 9/2010 | Miros et al. | 248/125.8 |
| 2011/0022177 | A1* | 1/2011 | Yeh | 623/17.15 |
| 2011/0068244 | A1* | 3/2011 | Hartelius et al. | 248/298.1 |
| 2012/0138764 | A1* | 6/2012 | Kemple | 248/316.1 |

FOREIGN PATENT DOCUMENTS

| | | |
|---|---|---|
| DE | 202009013609 U1 | 4/2010 |
| DE | 202010000121 U1 | 6/2010 |
| DE | 202010000208 U1 | 6/2010 |
| EP | 2090847 A2 | 8/2009 |
| EP | 2309552 A1 | 4/2011 |
| JP | 4-48410 U | 4/1992 |
| JP | 2005526202 A | 9/2005 |

* cited by examiner

CLAMPING CONNECTION FOR MOUNTING PLATE-LIKE COMPONENTS, IN PARTICULAR SOLAR MODULES

CROSS-REFERENCE TO RELATED APPLICATIONS

This application is a United States national phase application based on PCT/EP2012/003569 filed Aug. 23, 2012 which claims benefit of German Application Serial No. 10 2011 111 449.5 filed Aug. 30, 2011. The entire disclosure of the above application is hereby incorporated herein by reference.

FIELD OF THE INVENTION

The invention relates to a clamping connection for mounting plate-like components on rail-like supports, in particular solar modules that consist of a bearing and of a clamping cap. The supports have guide grooves with edges projecting inwardly into the groove into which a T-shaped abutment present on the bearing is inserted with its transverse bar and after a rotation of 90° engages behind the projection edges. The bearing itself has a central support bar that is aligned in the longitudinal direction of the clamping connection and has lateral wing strips, with bearing surfaces for the components and an abutment present on its bottom for fastening the bearing on the support. The clamping cap has a longitudinal groove comprising the upper part of the support bar and has clamping surfaces that cover the bearing surfaces of the bearing.

Various clamping connections are known for mounting plate-like components on supports. Clamping connections for solar modules have special tasks. On the one hand these clamping connections should be very stable considering the high mechanical loads produced by wind or snowfall and also on account of the size and weight of the modules. On the other hand, however, there is the requirement that no tensions occur on the modules by the clamping that could lead to formations of fissures on the very sensitive surfaces of the modules. The latter is especially significant in the case of frameless photovoltaic thin-layer modules.

BACKGROUND OF THE INVENTION

The general construction of a clamping connection of the type treated here can be gathered from EP 2000 309 552 A1. The clamping compound shown in the cited publication has a simple construction and allows a facilitated mounting on a support. The clamping connection essentially consists of three parts, namely, a clamping bearing, a clamping cap and a mounting screw. The bearing has on its bottom a T-shaped abutment whose foot projects from the bottom of the bearing and has a transverse bar that, set into the guide groove of the support, extends behind the projecting edges of the guide groove. This achieves a simple mounting of the bearing on the support. The clamping cap is set onto the bearing and screwed onto it by the mounting screw.

Other developments of this clamping connection are contained in the non-pre-published patent applications EP 11 001 120 and EP 11 001 119. The clamping connection is achieved in the form of a catch connection in both cited publications. The procedure is different here in that the catch connection in the one application takes place by a pin that is pressed through bores into the clamping cap in the bearing and engages into a catch cogging in the bearing. In the second embodiment the separate pin is eliminated and the clamping cap itself is connected to the catch pin to a unit. Consequently, in the latter embodiment the clamping connection has only two parts.

SUMMARY OF THE INVENTION

The invention starts from the previously cited prior art and suggests a more improved clamping connection that allows a simple manufacture, facilitates the mounting and at the same time results in a theft-proof mounting. The invention should be able to be used in particular for frameless, photovoltaic thin-layer modules independently of the thickness of the modules. The clamping connection should comprise all module thicknesses in the market and allow a simple mounting procedure. Even if larger tolerance spans are present in an individual module the module should be able to be fixed with a constant pretensioning- and holding force.

The solution of the posed problem is achieved with the features of claim 1. The subclaims 2 to 26 represent advantageous further developments of the subject matter of the invention.

Starting from the previously cited, non-pre-published patent applications, a spring disk is centrally housed in the present invention in the passage of the bearing, which disk grasps and fixes in a non-positive manner the holding pin provided for the holding connection. In this manner the clamping cap is immovably attached on the bearing by pressing the holding pin into the spring disk.

A separate pin can be provided as holding pin that is guided through openings in the clamping cap and in the bearing. However, the holding pin is preferably arranged integrally on the clamping cap. The holding pin itself has a smooth surface and can consequently be pressed into the spring disk to any depth. There are no limitations here, for example, as regards the position of given catch noses or the like. This means that the clamping connection can grasp the different thickness tolerances of a solar module as well as different thicknesses of a solar module itself. Furthermore, it was able to be determined that this holding connection results in an extremely high, constant holding force and that only relatively slight forces are required for pressing the holding pin into the spring disk. The pressing in of the holding pin into the spring disk can therefore be performed in a very simple manner by hand.

It is sufficient in most applications if only one holding connection is centrally arranged in the clamping connection. The spring disk can be housed in the transverse bar of the abutment.

The bearing is preferably surrounded by a layer of elastomer. This layer also comprehends the support bar, that is provided for the exact alignment of the clamping cap and that also assumes the lateral support of the modules. For the abutment the elastomeric layer is significant in as far is it makes possible an easy clamping of the bearing in the guide groove of the support so that the bearing remains at the given position on the support during the mounting.

It is advantageous if the bearing and also the clamping cap are produced from plastic. This simplifies the manufacture and, for example, is also not exposed to damage by rust and is positively characterized by a significant flexibility.

The bearing surfaces of the bearings and the clamping surfaces of the clamping cap are produced from an elastomer and are provided with a projecting profiling. It is especially advantageous here if the profilings of the bearing and of the clamping cap are arranged at an angle to each other as regards the pressing-in forces of the holding pin to be applied during the mounting. The angle is preferably 90°, so that the profilings lie transversely to one another. In a further development profilings of buffer strands consisting of an elastomer and of stop studs are formed, whereby the stop studs have an inner core of plastic that is connected in a uniform manner to the bearing and to the clamping cap. These stop studs have a lesser height than the buffer strands consisting completely of an elastomer. It is favorable if several buffer strands consisting of elastomer are arranged between two stop studs.

Spring disks of spring steel are preferably used that are provided with six slots and consequently have six spring tongues permanently resting on the holding pin. The slotless edge of the spring disk is constructed to be level and is embedded at least partially in the plastic material of the bearing. The clamping connection is constructed in such a manner that it laterally grasps a solar module of modules arranged in series. It is possible, for the use of the invention in the clamping of an end module of a module series, to construct the bearing and the clamping cap only on one side with bearing surfaces and clamping surfaces for the solar module. However, it is also possible to use the clamping connection, that is constructed with the clamping on two sides and that is basically provided for grasping two solar modules lying in series, for a clamping on one side in that a buttress is added in between the bearing surface of the bearing and the clamping surface of the clamping cap on the opposite side of the support bar. This buttress can consist, for example, of a single piece cut to length from an endless strand profile.

In order to be able to advantageously use the clamping connection of the invention even with larger solar modules, the clamping connection can be provided with several holding connections. Here, the clamping connection can have a central holding connection in which the spring disk is housed in the transverse bar of the abutment and comprises to this end several holding connections that are arranged at equal distances from the central holding connection and in which the spring disks are arranged in additional openings in the support bar into which the additional holding pins are pressed.

Finally, it is pointed out again that the clamping cap is provided in one embodiment with plastic in the form of a strip skeleton consisting of a bottom plate and of longitudinal and transverse strips. Such a strip skeleton allows a very precise manufacturing of the clamping cap.

DETAILED DESCRIPTION OF THE INVENTION

Figure 1:
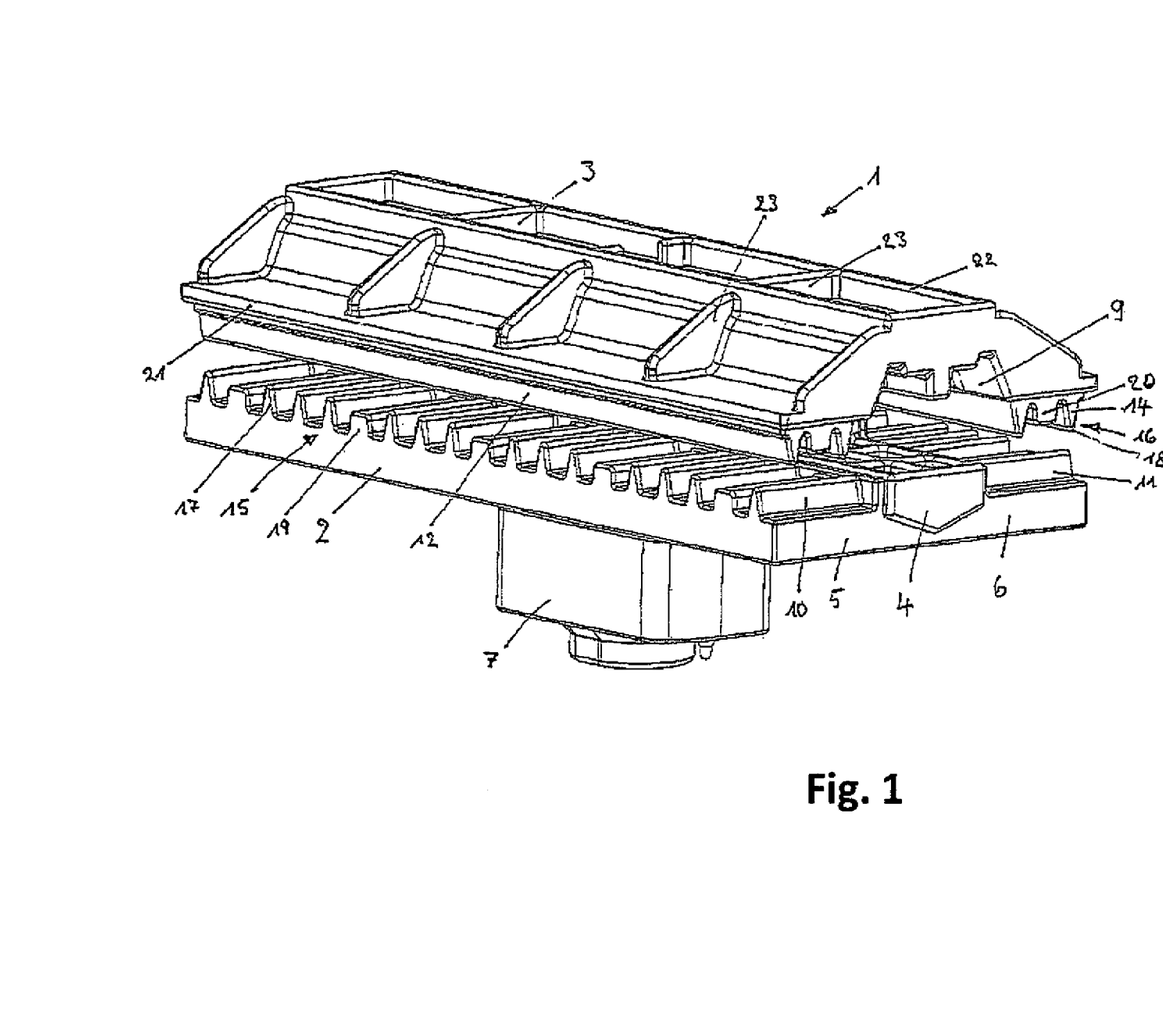
FIG. 1 shows a clamping connection in an isometric view for a transverse construction of the supports.

The clamping connection 1 shown in FIG. 1 consists of the bearing 2 and of the clamping cap 3. The bearing 2 comprises the central support bar 4 and the lateral wing strips 5 and 6. The abutment 7 for mounting the bearing on the support 8 is on the bottom of the bearing 2. The clamping cap 3 has a central longitudinal groove 9 that is inverted over the support bar 4 and therefore holds the clamping cap 3 in the exact longitudinal alignment with the bearing 2. The support bar 4 also assumes the supporting of the solar module edges with its side surfaces during the mounting procedure. The wing strips 5, 6 have the bearing surfaces 10, 11 for the solar modules 13 on their top. The bearing surfaces 10, 11 of the bearing 2 as well as the clamping surfaces 12, 14 of the clamping cap 3 consist of an elastomer with a projecting profiling 15, 16. The profiling 15 of the bearing 2 and the profiling 16 of the clamping cap 3 stand at an angle of 90° to one another. This alignment of the profilings 15 and 16 permits an especially soft pressing together of the clamping cap 3 onto the bearing 2. The profiles 15, 16 are subdivided into buffer strands 17, 18 that completely consist of an elastomer and of stop studs 19, 20 that are produced from plastic and are provided only with a coating of an elastomer. These plastic cores are connected in a unified manner to the bearing 2 and to the clamping cap 3 and constitute to a certain extent bump-like projections on them. The stop studs 19, 20 have a lesser height than the buffer strands 17, 18 consisting completely of an elastomer. Buffer strands 17, 18 can be alternatively inserted between the stop studs 19, 20. This is dependent on the holding force to be exerted by the buffer strands 17, 18. The clamping cap 3 consists in its basic structure of a strip skeleton, of a bottom plate 21 and of the longitudinal and transverse strips 22 and 23.

Figure 2:
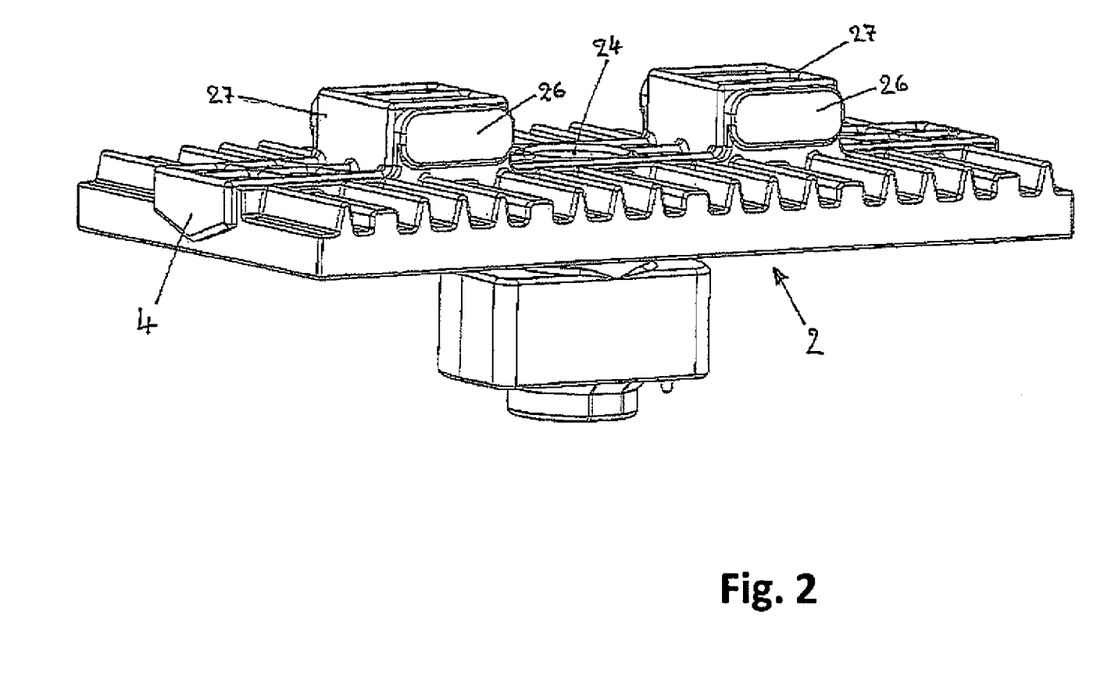
FIG. 2 shows the bearing according to FIG. 1 also in an isometric view.

FIG. 2 shows an isometric view of the bearing 2 in order to show the construction of the support bar 4 that is interrupted by the passage 24 for the holding connection 25. The support bar 4 comprises the attachments 27 on its top that comprise that support surfaces 26 coated with an elastomer on the side for the solar modules 13 to be clamped in.

Figure 3:
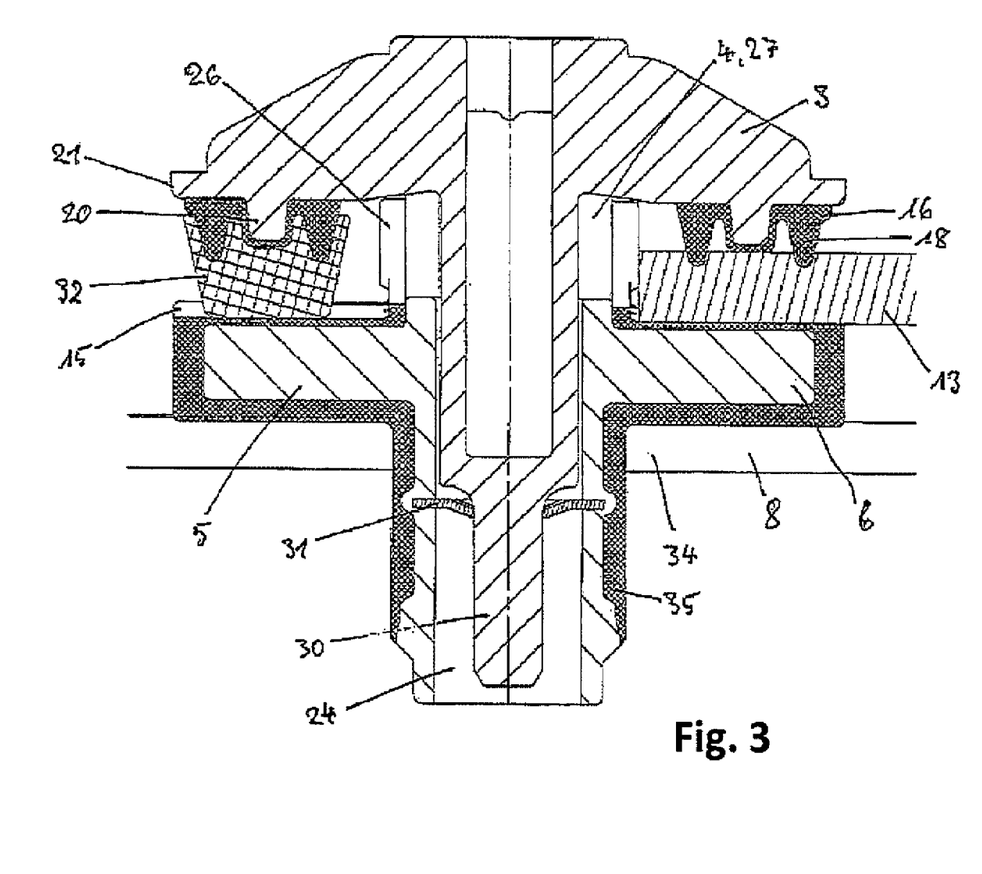
FIG. 3 shows a cross section through the middle of the clamping connection.
Figure 4:
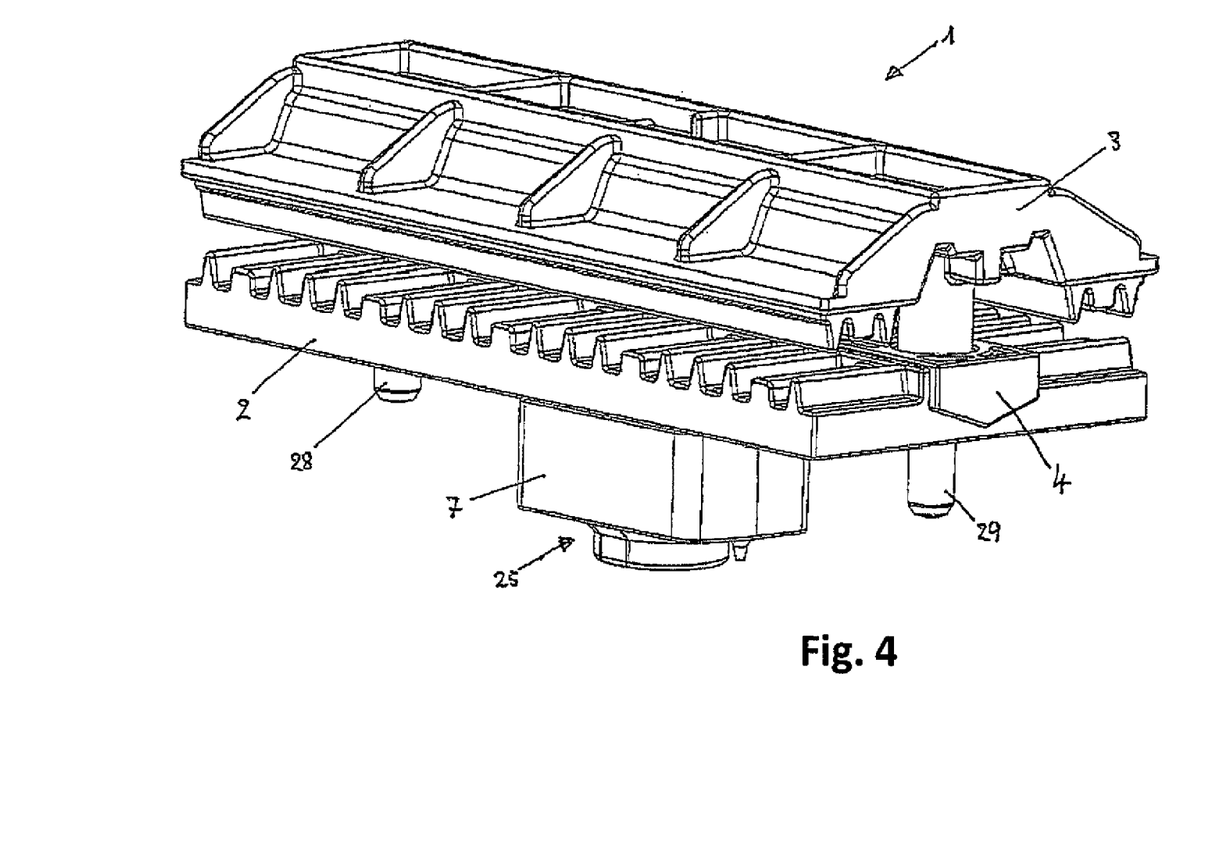
FIG. 4 shows an isometric view of a clamping connection with three holding connections.
Figure 5:
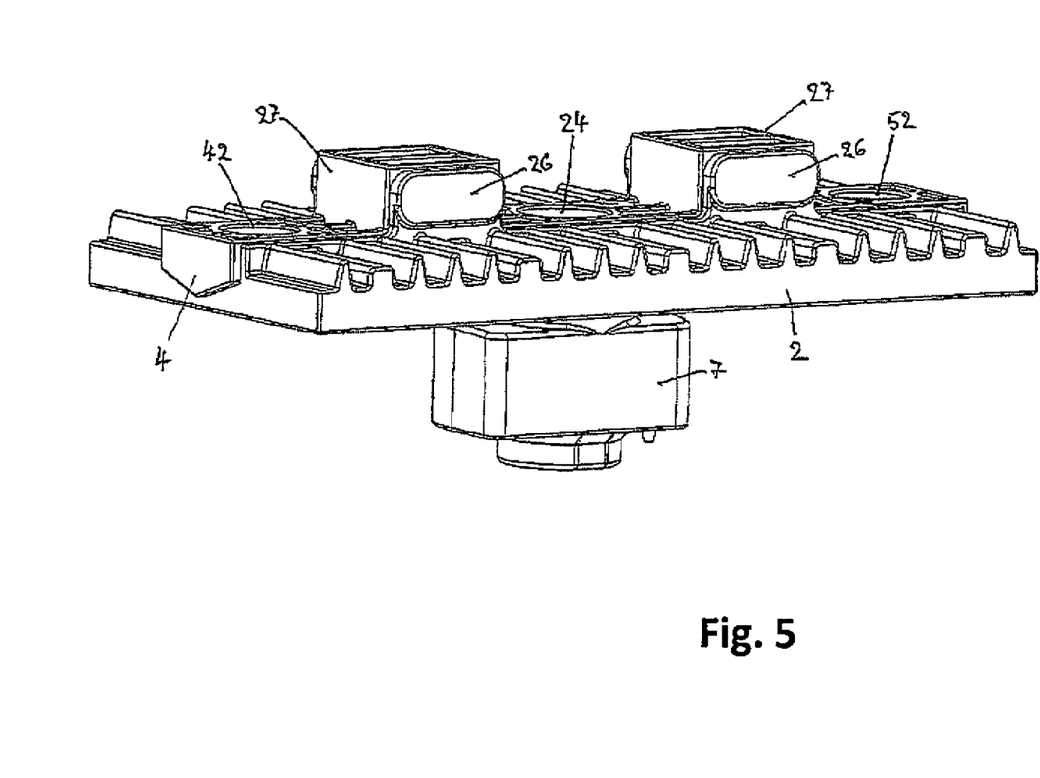
FIG. 5 shows an isometric view of the bearing of the clamping connection according to FIG. 4.
Figure 6:
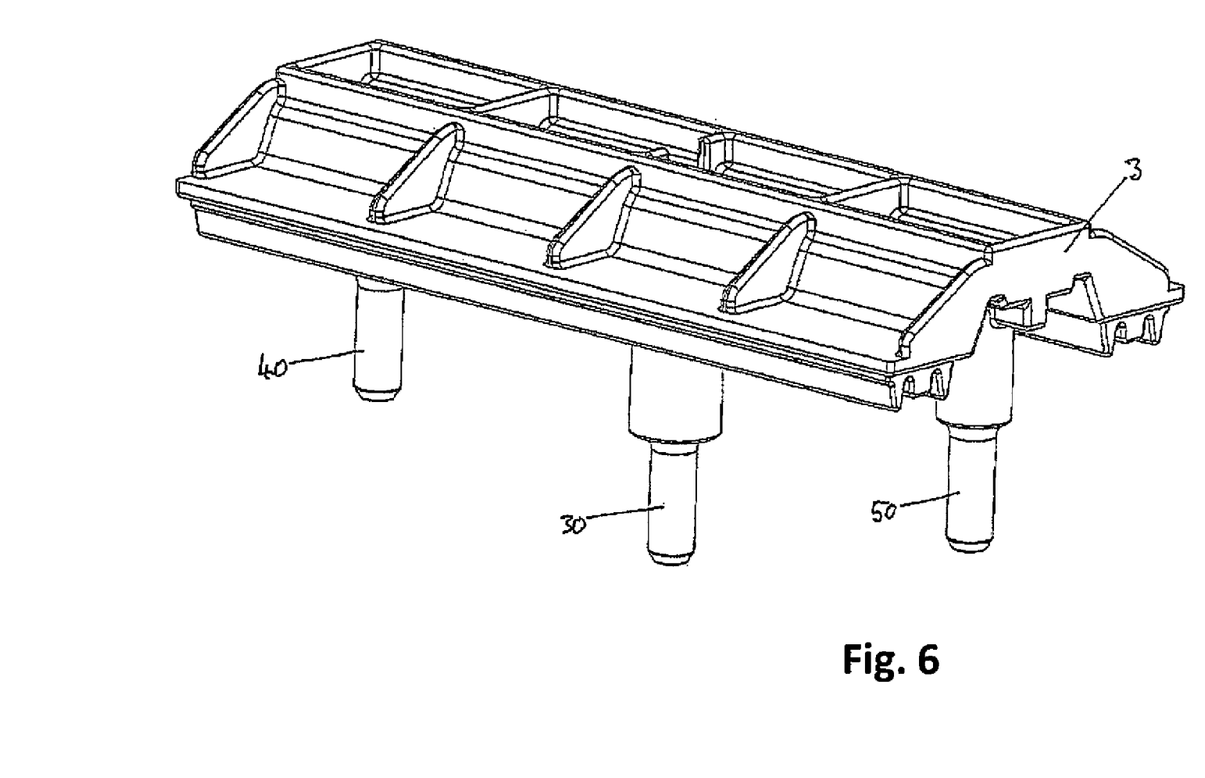
FIG. 6 shows the isometric view of the clamping cap of the clamping connection according to FIG. 4.

FIG. 3 shows a cross section through the middle of the clamping connection 1 from which the position of the holding pin 30 and of the spring disk 31 can be seen. Furthermore, the clamping in of a solar module 13 on the right side of the figure and the placing of a buttress 32 in a one-sided clamping of the solar module 13 is shown on the left side. The clamping cap 3 and the holding pin 30 are manufactured in a uniform manner as an individual piece, and likewise the barrier 2 with the wing strips 5, 6, the support bar 4 and the abutment 7. The holding pin 30 is located in the passage 24 of the bearing 2 and is pressed into the spring disk 31. The abutment 7 is inserted into the support 8 and extends behind the inwardly projecting edges 34 of the groove. The holding pin 30 itself has a smooth surface and can be pressed into the passage 24 to any desired depth and therefore into the spring disk 31. The bearing 2 is surrounded by an elastomeric coating 35. The profiles 15, 16 are attached to the bearing 2 and also to the clamping cap 3. The construction of the buffer strands 18 consisting completely of an elastomer and the construction of the stop studs 20 consisting of a plastic core with an elastomeric coating are made visible.

Figure 7:
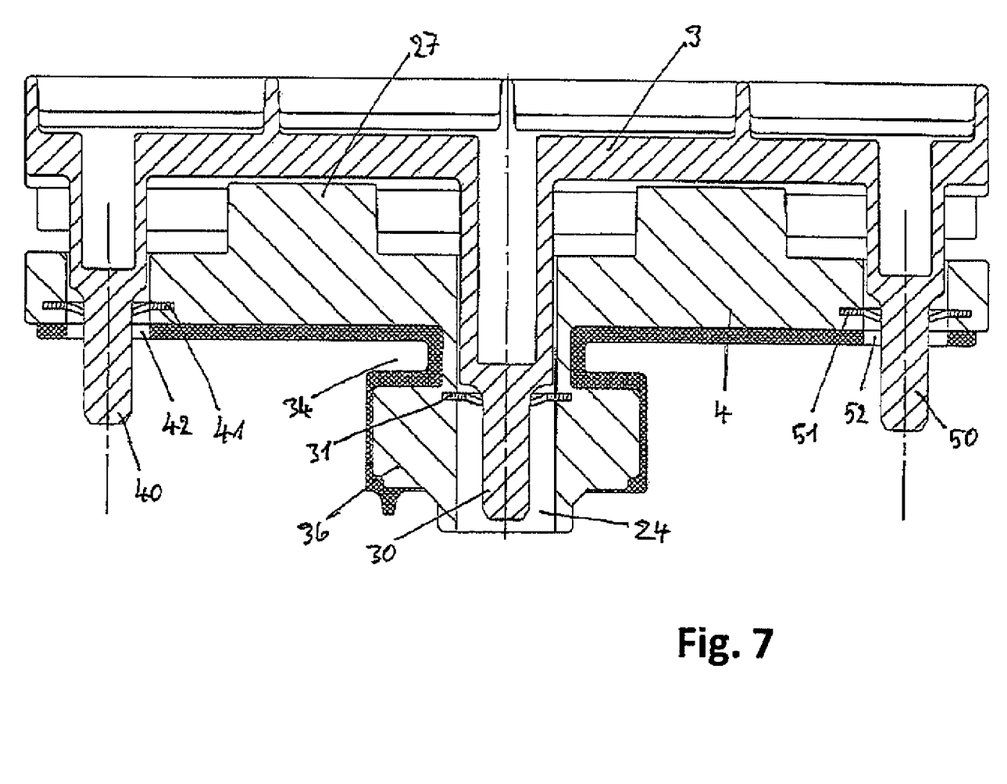
FIG. 7 shows a longitudinal section through the clamping connection according to FIG. 4.

FIGS. 4 to 7 show a clamping connection 1 comprising several holding connections 25, 28, 29. The clamping connection 1 comprises a central holding connection 25 in which the spring disk 31, as is provided in the FIGS. 1 to 3, is housed in the transverse bar 36 of the abutment 7, and two other holding connections 28 and 29 are provided with the central holding connection 25 in which connections 28 and 29 the spring disks are arranged in the passages 42, 52 in the support bar 4. For the main construction of the clamping connection from the FIGS. 1 to 3 is retained; however, the clamping connection is lengthened on the whole and the additional passages 42, 52 are placed in the support bar 4. A corresponding situation applies to the presentations in the FIGS. 5 to 7, in which the clamping cap 3 comprises three holding pins 30, 40 and 50 and the bearing 2 has three passages 24, 42 and 52. This clamping connection has a very uniform surface pressure on the solar modules, that as a rule are only 3 to 14 mm thick. FIG. 7 shows the arrangement of the spring disks 31, 41 and 51 in the abutment 7 and support bar 4.

Figure 8:
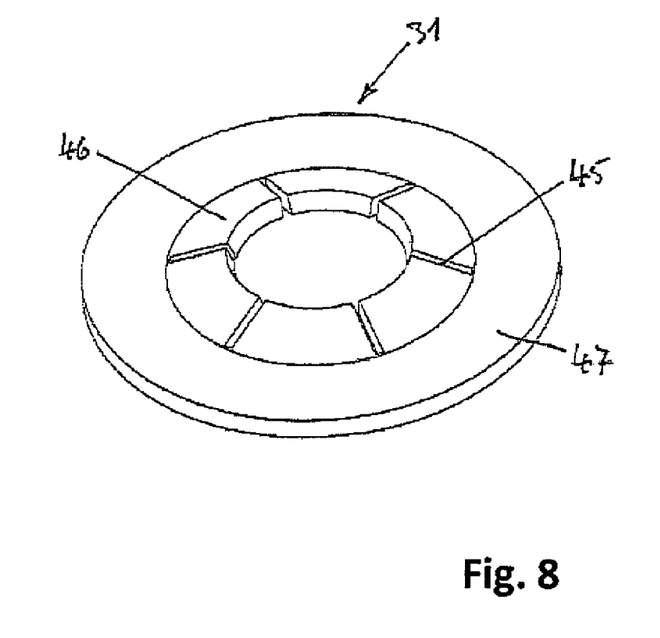
FIG. 8 shows an isometric view of a spring disk in an enlarged view.

FIG. 8 shows the construction of a spring disk 31 that comprises six slots 45 and therefore has six spring tongues 46. The slotless edge 47 of the spring disk 31 is designed to be smooth and is embedded in the plastic material of the bearing 2, as shown in FIGS. 3 and 7.

The invention claimed is:

1. A clamping connection for mounting plate-like components, the clamping connection comprising:
- a bearing having a central support bar longitudinally arranged thereon and a pair of wing strips extending laterally outwardly therefrom, each of the wing strips including a bearing surface formed thereon, the bearing having a passage formed therein;
- a clamping cap opposing the bearing and having a longitudinal groove formed therein configured to receive the support bar therein, the clamping cap including a pair of clamping surfaces disposed opposite the bearing surfaces of the wing strips;
- a holding pin disposed on the clamping cap and configured to be received in the passage of the bearing; and
- a spring disk disposed in the passage of the bearing and having a central aperture formed therein configured to receive a portion of the holding pin therein.

2. The clamping connection according to claim 1, wherein the holding pin is integrally formed with the clamping cap.

3. The clamping connection according to claim 1, wherein an outer surface of the holding pin is substantially smooth.

4. The clamping connection according to claim 1, further comprising an abutment depending from the bearing configured to mount the bearing on a support.

5. The clamping connection according to claim 4, wherein the passage of the beating is formed through at least a portion of the abutment.

6. The clamping connection according to claim 5, wherein the spring disk is disposed in the abutment.

7. The clamping connection according to claim 1, further comprising attachments formed on the support bar, the attachments having support surfaces formed thereon.

8. The clamping connection according to claim 1, wherein the spring disk includes an annular array of slots formed along an inner edge thereof to form a plurality of spring tongues.

9. The clamping connection according to claim 1, wherein the bearing includes an elastomeric layer formed thereon.

10. The clamping connection according to claim 1, wherein the bearing is formed from plastic.

11. The clamping connection according to claim 1, wherein the clamping cap is formed from plastic.

12. The clamping connection according to claim 1, wherein the bearing surfaces and the clamping surfaces have a projecting profiling.

13. The clamping connection according to claim 1, wherein the bearing surfaces and the clamping surfaces include a plurality of spaced apart buffer strands formed thereon.

14. The clamping connection according to claim 13, wherein the buffer strands are formed from an elastomer.

15. The clamping connection according to claim 13, wherein the buffer strands of the bearing surfaces and the buffer strands of the clamping surfaces are formed at an angle to one another.

16. The clamping connection according to claim 15, wherein the angle is about 90 degrees.

17. The clamping connection according to claim 1, wherein the bearing surfaces and the clamping surfaces include a plurality of spaced apart stop studs formed thereon.

18. The clamping connection according to claim 17, wherein the stop studs are formed from plastic and are coated with an elastomer.

19. The clamping connection according to claim 1, wherein the bearing surfaces and the clamping surfaces include a plurality of spaced apart buffer strands and a plurality of spaced apart stop studs formed thereon, the stop studs disposed intermediate the buffer strands.

20. The clamping connection according to claim 1, wherein the passage of the bearing is a holding connection, and wherein a plurality of holding connections is formed in the bearing, each of the holding connections including a spring disk disposed therein adapted to receive a portion of a holding pin therein, each holding pin formed on the clamping cap.

* * * * *